Feb. 25, 1964     L. STRIEBIG     3,122,183
CUTTING OF MAJOR STRUCTURAL PLATES

Filed Dec. 22, 1961     3 Sheets-Sheet 1

INVENTOR
LUDWIG STRIEBIG

BY Hammond + Littell

ATTORNEYS

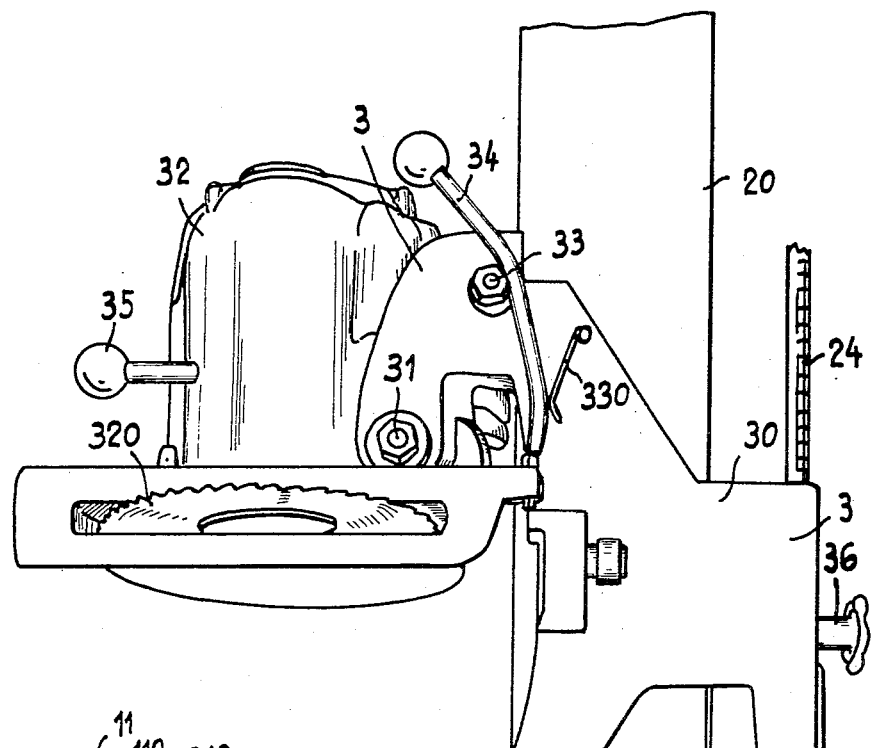
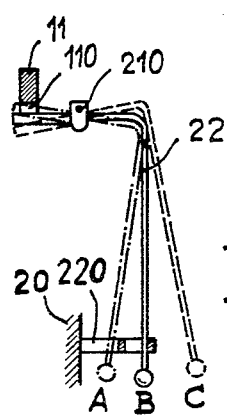

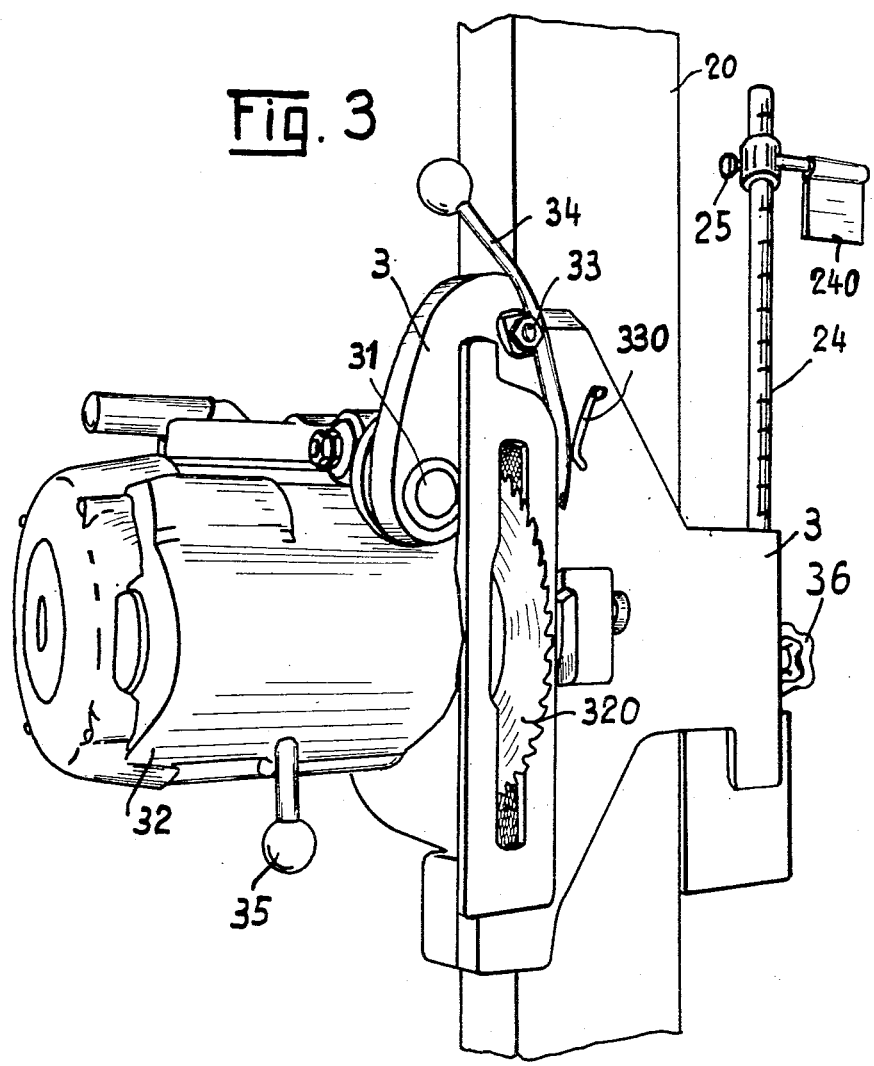

3,122,183
CUTTING OF MAJOR STRUCTURAL PLATES
Ludwig Striebig, Luzernerstrasse 54, Littau, Switzerland
Filed Dec. 22, 1961, Ser. No. 161,478
Claims priority, application Switzerland Mar. 17, 1961
5 Claims. (Cl. 143—47)

The invention relates to a device for cutting major structural plates to size or for cutting sections therefrom, which comprises an upright guide frame having support members for the rear face and the lower edge of the structural plate to be cut, a vertical guide arrangement which moves horizontally on the upright frame and a motor driven saw cutter disc pivotally mounted on a pivot axle perpendicular to the plane of the upright guide frame so that it may be turned to vertical and horizontal cutting planes, said disc being attached to the vertical guide arrangement.

It is an object of the invention to provide a device capable of cutting large structural plates to size in horizontal and vertical planes.

It is another object of the invention to provide a device capable of cutting sections out of large structural plates.

These and other objects and advantages of the invention will become obvious from the following detailed description.

Referring now to the drawings which illustrate one embodiment of the invention:

FIG. 2 is a view of the carrier of the saw cutter disc from the rear,

FIG. 3 is a view corresponding to FIG. 2 with the cutting plane in a vertical position, FIG. 4 is a part-view of the null rest mechanism of the vertical guide arrangement in the upper guide rail of the frame as viewed from the left hand side of FIG. 1.

Figure 1:
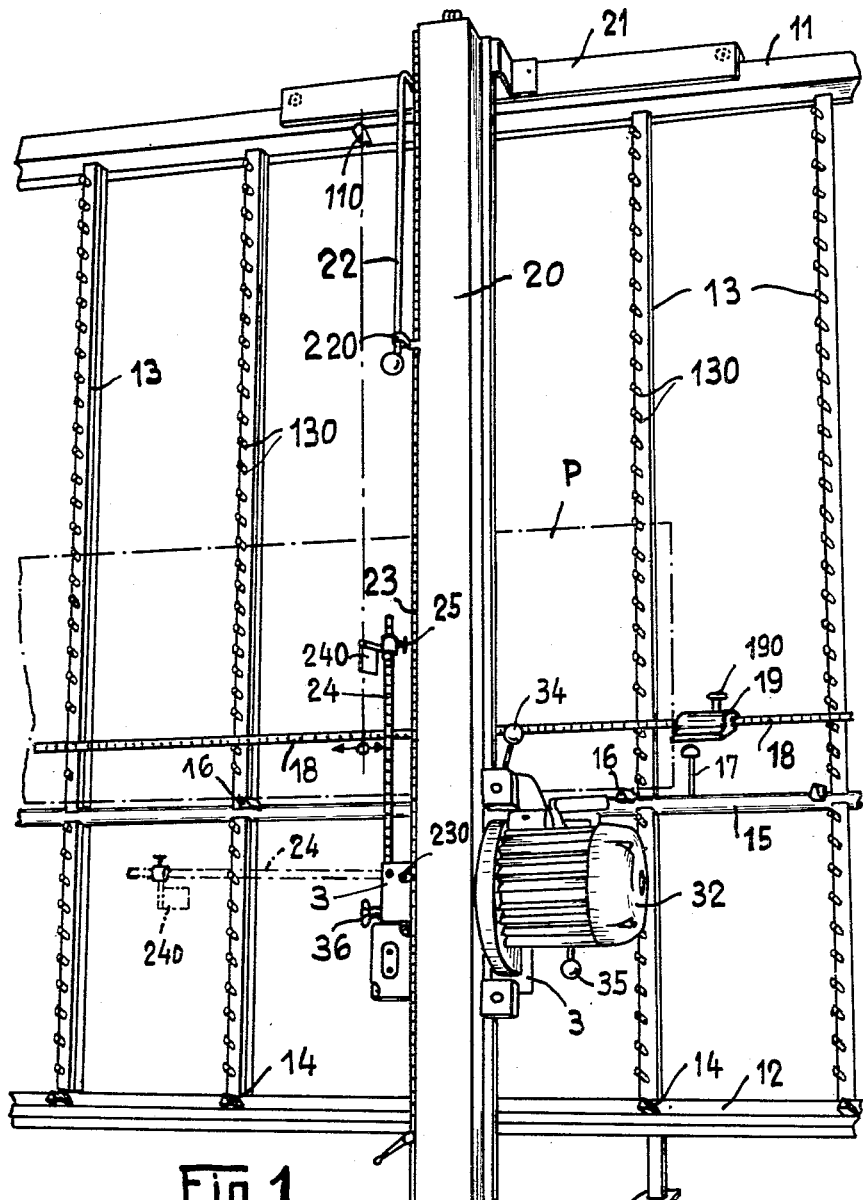
FIG. 1 is a part-view of the device.

According to FIG. 1 an upright guide frame for horizontally shifting a vertical guide arrangement of a motor driven saw comprises an upper guide rail 11 for an upper guide carriage 21 of a vertical guide rail 20, on which the carrier 3 of a motor driven saw is vertically movable.

Between the upper guide rail 11 and a lower rail 12 of the frame, vertical battens 13 are inserted which are provided with rows of holes for the insertion of wooden pegs 130, the frontal end faces of which lie in a common vertical plane and which form the support area for the rear face of a structural plate P, e.g. of pressed fibrous material or wood, which plate is to be cut to size or from which sections are to be cut out. For supporting the lower edge of this structural plate, support brackets 14 project forward from the lower rail 12 of the frame. In order that structural plates of lesser height may be supported at a higher level without the necessity of the personnel using the device to bend down, a horizontal shaft 15 having support brackets 16 similar to brackets 14 is journalled in the battens 13, which brackets can be turned 90° by turning the shaft 15 with lever 17, so that the support brackets 16 no longer project beyond the abutment plane of the pegs 130.

On the vertical guide rail 20, as seen in FIG. 4 a bellcrank lever 22 is pivotally mounted at 210, the grip end of which is associated with a holder 220 in order to adjust it to the positions A, B or C. The other end of the bellcrank lever 22 co-operates with a null rest recess 110 at the underside of the upper guide rail 11 as a detent member.

In the position A the bellcrank lever 22 is locked in the rest recess 110 of the guide rail 11 so that no lateral shifting of the parts 20, 21 along the frame is possible.

In the position C the upper arm of the bellcrank lever is out of any contact with the underside of the rail 11, and in the intermediate position B the upper arm of the bellcrank lever 22 abuts the underside of the rail 11, so that the guide carriage 21 can be clamped on to the rail 11 in any desired position.

On the same abscissa point as the null rest recess 110 a horizontal scale 18, fixed to the battens 13, has its zero mark. On the scale 18 is an abutment slide 19 which moves horizontally and may be held in place by means of a clamping member 190. The left hand side abutment edge of the part 19 defines the selected adjustment of the distance between the right hand edge of the plate P and the zero mark of the horizontal scale. Along the vertical guide rail 20 a vertical scale 23 is arranged, which in conjunction with a pointer 230 on the carrier 3 of the motor driven saw allows the operator to read off the distances of vertical movements. Into the carrier 3 of the motor driven saw an auxiliary scale 24 is inserted on which a tiltable abutment flag 240 is arranged slidably and is capable of being fixed by means of a screw 25.

In order that this auxiliary scale 24 may be usable also for sawing in the vertical direction (with the motor driven saw tipped over), it is advantageously mounted pivotally on the carrier 3 of the motor driven saw so that it can be turned into the position drawn in chain-dotted lines.

The construction of the carrier 3 of the motor driven saw is more clearly shown in FIGS. 2 and 3. It comprises a carriage 30, which may slide on the rail 20 and has a bearing eye 31 for a pivot pin standing perpendicular to the plane of the frame for the motor casing 32 with the saw cutter disc 320.

On a pivot pin 33 of the carriage 30 a pawl lever 34 is mounted, pre-loaded by a spring 330 which secures the motor casing in the position according to FIG. 2, i.e. with a horizontal cutting plane of the saw cutter disc, as well as in the position according to the FIGS. 1 and 3, i.e. with a vertical cutting plane of the saw cutter disc. When this pawl lever 34 is released, the casing 32 of the motor driven saw may be swung from one working position into the other by means of the lever 35.

Preferably the carrier for the motor driven saw is connected to a cable system provided with counterpoises located in the vertical guide rail 20, and arrester means are provided on the carrier 3 of the motor driven saw, e.g. a clamping screw 36, in order to prevent a vertical movement of these components in the guide rail.

Various modifications of the device of the invention may be made without departing from the spirit or scope of the invention and it is to be understood that the invention is to be limited only as defined in the appended claims.

I claim:

1. A device for cutting large structural plates comprising a vertical guide frame having support members for the rear face of the structural plates, support brackets along the bottom of the vertical guide frame and protruding beyond the plane of the frame, additional support brackets mounted on at least one horizontal shaft higher in the plane of said frame which shaft is behind the support plane and is rotatable to move said brackets behind the support plane, a horizontal guide means at the top of the vertical guide frame, a vertical guide means which moves horizontally on the horizontal guide means and a motor driven saw cutter disc pivotally mounted on a vertically movable carrier on the vertical guide means by a pivot axle perpendicular to the plane of the vertical guide frame so the cutter disc may be turned to vertical and horizontal cutting planes.

2. The device of claim 1 wherein the support members for the rear face of the structural plates are pegs made of cuttable material which are exchangeably seated in vertical battens in the plane of the vertical guide frame.

3. The device of claim 1 wherein there is a horizontal scale attached to the vertical guide frame and a vertical scale attached to the vertical guide means for measuring the length of cuts and markers on said scales for reading off the said lengths.

4. A device for cutting large structural plates comprising a vertical guide frame having support members for the rear face of the structural plates, support brackets along the bottom of the vertical guide frame and protruding beyond the plane of the frame, additional support brackets mounted on at least one horizontal shaft higher in the plane of said frame which shaft is behind the support plane and is rotatable to move said brackets behind the support plane, a horizontal guide means at the top of the vertical guide frame, a vertical guide means which moves horizontally on the horizontal guide means, a horizontal scale and a vertical scale for measuring the length of cuts, markers on said scales for reading off the said lengths, a rest recess on the horizontal guide means at the zero point abscissa of the horizontal scale, a detent member cooperating with the rest recess and adjustable to lie outside the effective range of the rest recess, an abutment member for the vertical edge of the structural plate capable of being arrested on the horizontal scale at the desired abscissa position and a motor driven saw cutter disc pivotally mounted on a vertically movable carrier on the vertical guide means by a pivot axle perpendicular to the plane of the vertical guide frame so the cutter disc may be turned to vertical and horizontal cutting planes.

5. A device for cutting large structural plates comprising a vertical guide frame having support members for the rear face of the structural plates, support brackets along the bottom of the vertical guide frame and protruding beyond the plane of the frame, additional support brackets mounted on at least one horizontal shaft higher in the plane of said frame which shaft is behind the support plane and is rotatable to move said brackets behind the support plane, a horizontal guide means at the top of the vertical guide frame, a vertical guide means which moves horizontally on the horizontal guide means, a horizontal scale attached to the vertical guide frame and a vertical scale attached to the vertical guide means for measuring the length of cuts, markers on said scales for reading off the said lengths, a rest recess on the horizontal guide means at the zero point abscissa of the horizontal scale, a detent member cooperating with the rest recess and adjustable to lie outside the effective range of the rest recess, an abutment member for the vertical edge of the structural plate capable of being arrested on the horizontal scale at the desired abscissa position and a motor driven saw cutter disc pivotally mounted on a vertically movable carrier on the vertical guide means by a pivot axle perpendicular to the plane of the vertical guide frame so the cutter disc may be turned to vertical and horizontal cutting planes and a vertical scale tiltable through a 90° arc mounted on the vertically movable carrier, said scale having an abutment member movable thereon and cooperating with the upper lateral edge of the structural plate to be cut.

References Cited in the file of this patent
UNITED STATES PATENTS

| | | |
|---|---|---|
| 2,211,082 | Smith | Aug. 13, 1940 |
| 2,785,708 | Krogen | Mar. 19, 1957 |
| 3,008,498 | Olson | Nov. 14, 1961 |